(12) United States Patent
Kusakabe et al.

(10) Patent No.: US 7,150,039 B2
(45) Date of Patent: Dec. 12, 2006

(54) INFORMATION PROCESSING SYSTEM, PORTABLE ELECTRONIC DEVICE, ACCESS APPARATUS FOR THE PORTABLE ELECTRONIC DEVICE, AND METHOD OF USING MEMORY SPACE

(75) Inventors: Susumu Kusakabe, Kanagawa (JP); Masayuki Takada, Tokyo (JP); Masachika Sasaki, Kanagawa (JP)

(73) Assignee: Sony Corporation, Tokyo (JP)

( * ) Notice: Subject to any disclaimer, the term of this patent is extended or adjusted under 35 U.S.C. 154(b) by 888 days.

(21) Appl. No.: 09/754,652

(22) Filed: Jan. 4, 2001

(65) Prior Publication Data

US 2001/0029579 A1 Oct. 11, 2001

(30) Foreign Application Priority Data

Jan. 7, 2000 (JP) ............................ P2000-005910

(51) Int. Cl.
*G06F 7/04* (2006.01)
*G06F 7/58* (2006.01)
*G06F 15/16* (2006.01)
*G06F 17/30* (2006.01)
*G06K 9/00* (2006.01)
*G06K 19/00* (2006.01)
*H04K 1/00* (2006.01)
*H04L 9/00* (2006.01)

(52) U.S. Cl. ........................................... 726/9; 705/66
(58) Field of Classification Search ................ 713/172; 380/284, 45, 283; 455/410; 705/64–69; 235/380; 726/9

See application file for complete search history.

(56) References Cited

U.S. PATENT DOCUMENTS

| | | | | |
|---|---|---|---|---|
| 4,633,037 A | * | 12/1986 | Serpell | 705/71 |
| 4,650,975 A | * | 3/1987 | Kitchener | 235/375 |
| 4,656,342 A | * | 4/1987 | Ugon | 235/379 |
| 4,710,613 A | * | 12/1987 | Shigenaga | 235/380 |
| 4,849,614 A | | 7/1989 | Watanabe et al. | |
| 5,161,256 A | | 11/1992 | Iijima | |
| 5,202,922 A | | 4/1993 | Iijima | |
| 5,241,600 A | * | 8/1993 | Hillis | 713/186 |
| 5,379,344 A | * | 1/1995 | Larsson et al. | 380/251 |
| 5,590,038 A | * | 12/1996 | Pitroda | 705/41 |
| 5,745,571 A | * | 4/1998 | Zuk | 235/380 |

(Continued)

FOREIGN PATENT DOCUMENTS

EP 0 798 673 A1 10/1997

(Continued)

OTHER PUBLICATIONS

Canetti, Ran et al. "SMuG.0", <http://www.securemulticast.org/smug1-minutes.PDF>, Aug. 1998.*

(Continued)

*Primary Examiner*—Jacques Louis-Jacques
*Assistant Examiner*—Michael J. Simitoski
(74) *Attorney, Agent, or Firm*—Bell, Boyd & Lloyd LLC

(57) ABSTRACT

The invention provides an information processing system, a portable electronic device, an access apparatus for the portable electronic device, as well as a method of using a memory space. When applied to, for example, a system employing non-contact IC cards, the invention enables one IC card to be used for a plurality of business organizations in common. To this end, an access key is created based on issuer key information managed by a management sector and file key information specific to each business organization, and the created access key is signed to the business organization. A portable electronic device is then accessed using the access key.

14 Claims, 11 Drawing Sheets

U.S. PATENT DOCUMENTS

| | | | |
|---|---|---|---|
| 5,856,659 A * | 1/1999 | Drupsteen et al. | 235/380 |
| 5,991,749 A * | 11/1999 | Morrill, Jr. | 705/44 |
| 6,005,942 A * | 12/1999 | Chan et al. | 713/187 |
| 6,038,551 A * | 3/2000 | Barlow et al. | 705/41 |
| 6,267,292 B1 * | 7/2001 | Walker et al. | 235/379 |
| 6,298,336 B1 * | 10/2001 | Davis et al. | 705/41 |
| 6,644,553 B1 * | 11/2003 | Ohki et al. | 235/492 |
| 6,789,166 B1 * | 9/2004 | Kamise et al. | 711/115 |
| 2002/0040438 A1 | 4/2002 | Fisher, Jr. | |

FOREIGN PATENT DOCUMENTS

| | | |
|---|---|---|
| EP | 0 867 843 A2 | 9/1998 |
| FR | 2 635 890 | 3/1990 |
| FR | 2 670 036 | 6/1992 |
| WO | WO 97/37331 | 10/1997 |
| WO | WO 98/43212 | 10/1998 |

OTHER PUBLICATIONS

Sato, Fumiaki et al. "A Push-Based Key Distribution and Rekeying Protocol for Secure Multicasting", 2001 IEEE.*

Schneier, Bruce. Applied Cryptography, Second Edition. 1996 John Wiley & Sons, Inc., pp. 183-184.*

Yang, Richard Yang et al. "Reliable Group Rekeying: A Performance Analysis", 2001 ACM.*

* cited by examiner

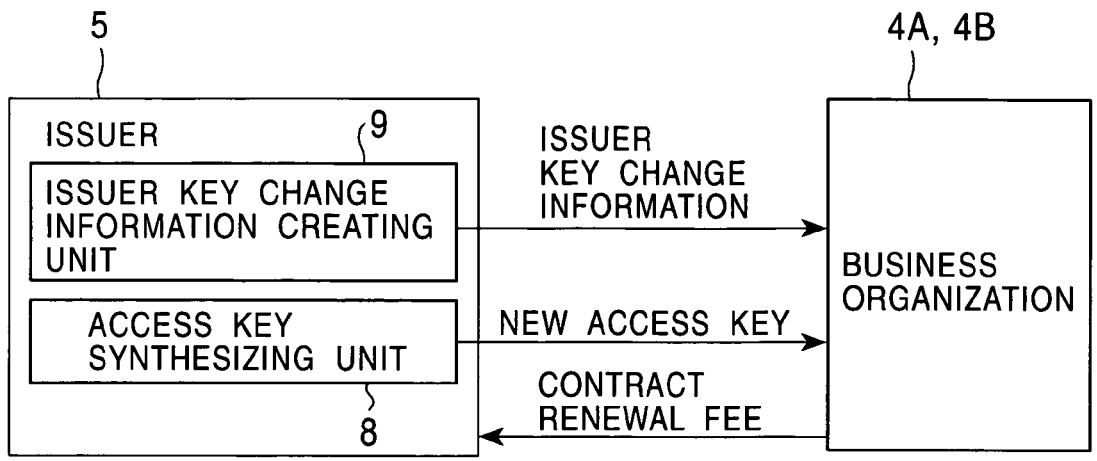
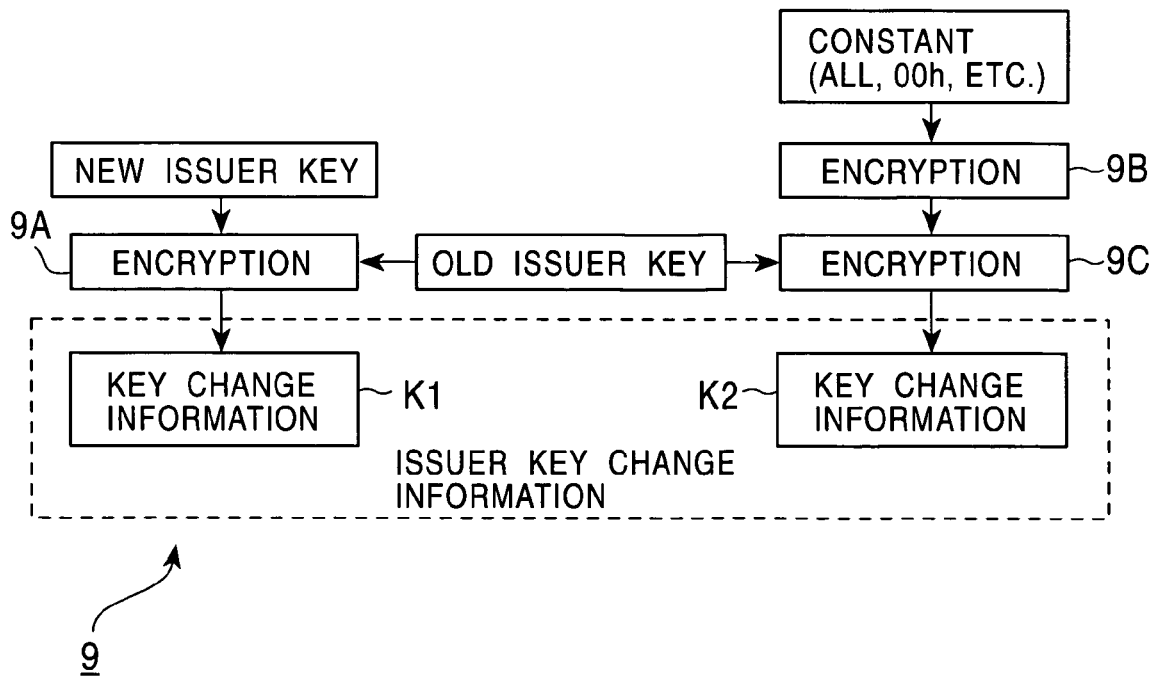

INFORMATION PROCESSING SYSTEM, PORTABLE ELECTRONIC DEVICE, ACCESS APPARATUS FOR THE PORTABLE ELECTRONIC DEVICE, AND METHOD OF USING MEMORY SPACE

BACKGROUND OF THE INVENTION

1. Field of the Invention

The present invention relates to an information processing system, a portable electronic device, an access apparatus for the portable electronic device, as well as a method of using a memory space. The present invention can be applied to, for example, a system employing non-contact IC cards. More particularly, the present invention is intended to enable an IC card to be used for a plurality of business organizations in common by assigning, to each business organization, both issuer key information managed by a management sector and an access key, which is created based on file key information specific to the business organization, so that the business organization can access the portable electronic device using the assigned access key.

2. Description of the Related Art

In an earlier developmental IC card system, various items of information, such as personal data, are recorded in an IC card carried with a person, and the IC card is used, for example, when the person passes through ticket gates at stations or enters a room that is under management allowing only qualified persons to enter and exit it.

Meanwhile, there are other card-shaped mediums similar to IC cards. For example, prepaid cards, service cards issued by individual shops, user cards issued by individual software makers, etc. have been used increasingly.

Those cards, including IC cards, are separately issued to users by business organizations that provide respective services on the basis of the specific cards.

An IC card, however, incorporates an internal memory having a capacity enough to record therein personal information and other data that are necessary for receiving various services with the card. From this point of view, it is conceivable to make one IC card usable for a plurality of business organizations in common.

By making an IC card so usable in common, the business organizations, which have individually issued IC cards up to date, are released from the burden of issuing the cards by themselves, while they can get a larger number of users who cannot be gained when each business organization issues one card separately as conventional. On the other hand, since the number of cards to be carried with and managed by a user is reduced, the user is also released from an inconvenience in carrying and managing many cards.

However, when an IC card is used for a plurality of business organizations in common, personal information of a user must be kept confidential for each of the business organizations. It is also required to manage a memory space employed by each business organization in terms of time and area.

SUMMARY OF THE INVENTION

The present invention has been accomplished in view of the state of the art described above, and an object of the present invention is to provide an information processing system, a portable electronic device, an access apparatus for the portable electronic device, as well as a method of using a memory space, with which an IC card or the like can be used for a plurality of business organizations in common.

To achieve the above object, according to a first aspect of the present invention, there is provided an information processing system in which a memory unit in a portable electronic device is employed by a plurality of business organizations in common, wherein the system comprises a management sector for creating issuer key information; an access apparatus possessed by each of the plurality of business organizations for accessing the portable electronic device, the access apparatus containing file key information assigned to each business organization; a unit for creating access key information based on the issuer key information and the file key information; and a unit for executing authentication between the access apparatus and the portable electronic device by using the access key information.

According to a second aspect of the present invention, there is provided an access apparatus for a portable electronic device, the access apparatus being used to access the portable electronic device and applied to an information processing system in which a memory unit in the portable electronic device is employed by a plurality of business organizations in common, wherein the access apparatus comprises file key information assigned to each of the plurality of business organizations; access key information created based on the file key information and issuer key information possessed by a predetermined management sector; and a unit for executing processing of authentication between each business organization and the portable electronic device by using the access key information, the authentication being required for effecting an access to the portable electronic device.

According to a third aspect of the present invention, there is provided a portable electronic device including a memory unit which is employed by a plurality of business organizations in common, wherein the portable electronic device comprises a memory unit having memory spaces allocated to the plurality of business organizations, the memory unit storing file key information specific to each of the plurality of business organizations and first issuer key information; a unit for processing information transmitted from an access apparatus with the file key information and the first issuer key information; and a unit for determining a result obtained by the processing unit and, depending on a determined result, allowing the access apparatus to access the memory space corresponding to the file key information.

According to a fourth aspect of the present invention, there is provided a method of using a memory space allocated in a memory unit that is provided in a portable electronic device to be employed by a plurality of business organizations in common, wherein the method comprises the steps of executing authentication between the portable electronic device and the business organization by using file key information assigned to each of the plurality of business organization and first access key information created based on first issuer key information that is created by a management sector; determining based on a result of the authentication whether the portable electronic device and the business organization are targets between which data can be mutually communicated, and accessing a memory space allocated in the memory unit when the targets are communicable therebetween; and updating the memory space after accessing.

With the first aspect of the present invention, the processing of authentication is executed using the access key information created by the predetermined management sector based on both the file key information specific to each business organization and the issuer key information specific to the management sector. As a result of the authentication, the access apparatus is allowed to access a memory space in the portable electronic device, which is allocated to the business organization. Therefore, even when memory spaces are allocated to a plurality of business organizations and one portable electronic device is used for those business organizations in common, each business organization can make an access to the portable electronic device using the file key information as if the portable electronic device is dedicated to the business organization. Also, the memory space allocated to a certain business organization can be prevented from being accessed by any other business organization. Further, since the issuer key information is managed by the management sector, it is possible to manage the portable electronic device by the management sector.

With the second aspect of the present invention, the processing of authentication required for effecting an access to the portable electronic device is executed using the access key information, which is created by the predetermined management sector, between the access apparatus and the portable electronic device based on both the file key information specific to each business organization and the issuer key information specific to the management sector. Therefore, only a business organization, which is authorized by the management sector based on the issuer key, can access the portable electronic device. Also, the memory space allocated to the business organization can be specified by the file key information. As a result, each business organization can make an access to the portable electronic device as if it is dedicated to the business organization. Also, the memory space allocated to a certain business organization can be prevented from being accessed by any other business organization. Further, since the issuer key information is managed by the management sector, it is possible to manage the portable electronic device by the management sector.

With the third aspect of the present invention, the portable electronic device holds therein both the file key information specific to each business organization and the issuer key information specific to the predetermined management sector. Then, the portable electronic device processes information transmitted from a certain access apparatus by using the file key information and the issuer key information, and then determines a result of the processing. Depending on a determined result, the access apparatus is allowed to access the memory space corresponding to the file key information. Therefore, even when memory spaces in one portable electronic device are accessed by a plurality of business organizations, the memory space allocated to each business organization can be specified with the file key information. As a result, each business organization can make an access to the portable electronic device as if it is dedicated to the business organization. Also, the memory space allocated to a certain business organization can be prevented from being accessed by any other business organization. Further, since the issuer key information is managed by the management sector, it is possible to manage the portable electronic device by the management sector.

BRIEF DESCRIPTION OF THE DRAWINGS

FIG. 7 is a block diagram for explaining issuance of issuer key change information;

FIG. 8 is a block diagram for explaining creation of issuer key change information;

DESCRIPTION OF THE PREFERRED EMBODIMENTS

Embodiments of the present invention will be described below in detail with reference to the drawings.

(1) First Embodiment (1-1) Construction of First Embodiment

Figure 2:
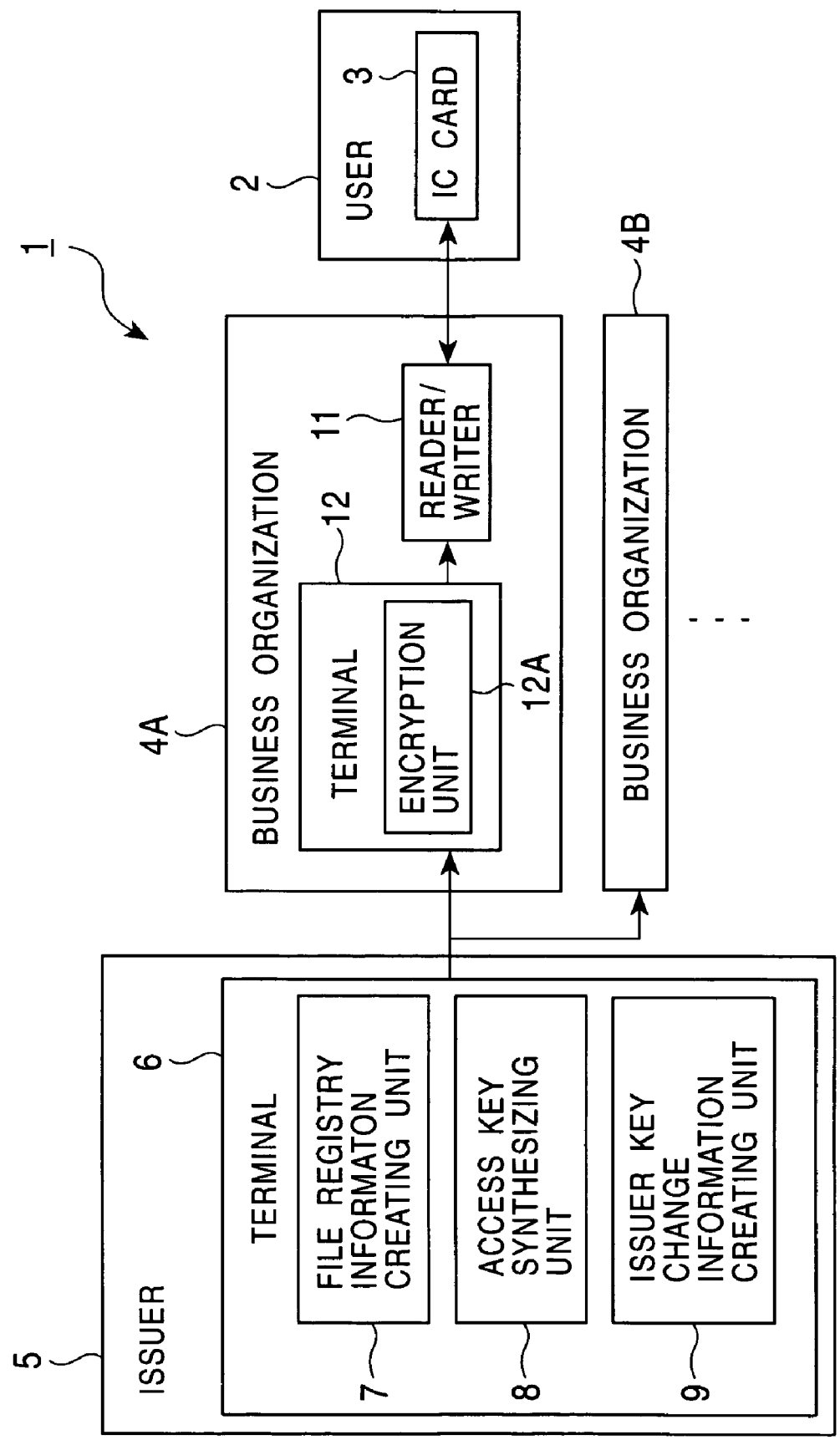
FIG. 2 is a block diagram showing a business organization and an issuer in the IC card system of FIG. 1.

FIG. 2 is a block diagram showing an IC card system according to a first embodiment of the present invention. In an IC card system 1 of FIG. 2, an issuer 5 serving as a management sector for an IC card 3 issues the IC card 3 so that a user 2 carrying the IC card 3 can utilize it in common for services provided by a plurality of business organizations 4A, 4B, etc.

Figure 3:
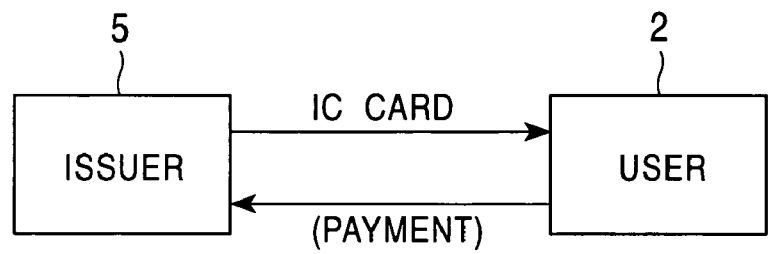
FIG. 3 is a block diagram for explaining issuance of an IC card.
Figure 4:
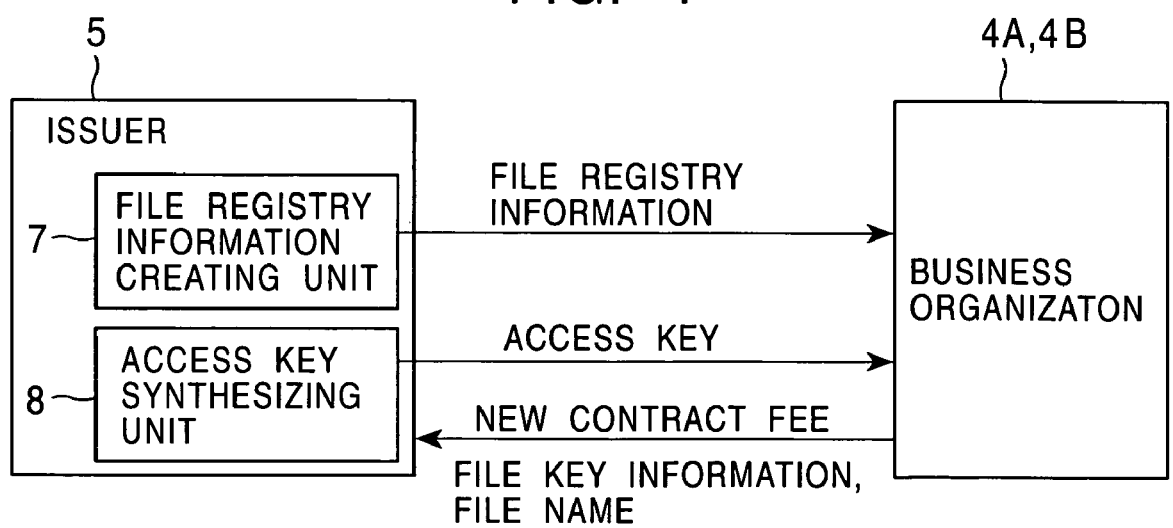
FIG. 4 is a block diagram for explaining issuance of file registry information.

More specifically, as shown in FIG. 3, the issuer 5 issues the IC card 3 to a user upon direct payment of the fee by the user, or indirect payment of the fee by the user via any of the business organizations 4A, 4B, etc., or payment of any of the business organizations 4A, 4B, etc. instead of the user. The issuer 5 may issue the IC card 3 to a user directly or via any of the business organizations A, 4B, etc.

When issuing the IC card 3, the issuer 5 records an issuer key in the IC card 3. The issuer key is key information for encryption and decryption, which is specific to the issuer 5 and managed by the issuer 5. In the IC card system 1, an access to the IC card 3 is effected using both the issuer key and file key information, which is key information specific to each of the plurality of business organizations 4A, 4B, etc. Thus, the IC card 3 can be used for the business organizations 4A, 4B, etc. in common under management of the issuer.

The issuer 5 records the issuer key in the IC card 3 by using a management terminal 6 constituted by, e.g., a computer. Also, when the IC card 3 is to be used for services provided by the business organizations 4A, 4B, etc. under contracts between the issuer 5 and the business organizations 4A, 4B, etc., the issuer 5 creates file registry information and an access key respectively by a file registry information creating unit 7 and an access key synthesizing unit 8 in the terminal 6. The file registry information and the access key are passed to corresponding one of the business organizations 4A, 4B, etc.

The file registry information is information used for securing a memory space in the IC card 3 so that each business organization 4A, 4B, etc. can handle the IC card 3 for the service provided by itself. Upon receiving the file registry information, the IC card 3 allocates a memory space therein corresponding to the file registry information. The access key is information used for authentication when an access is made to the allocated memory space. Eventually, the access key is information used to execute processing of authentication using both the file key information and the issuer key that have been assigned to each business organization.

Figure 5:
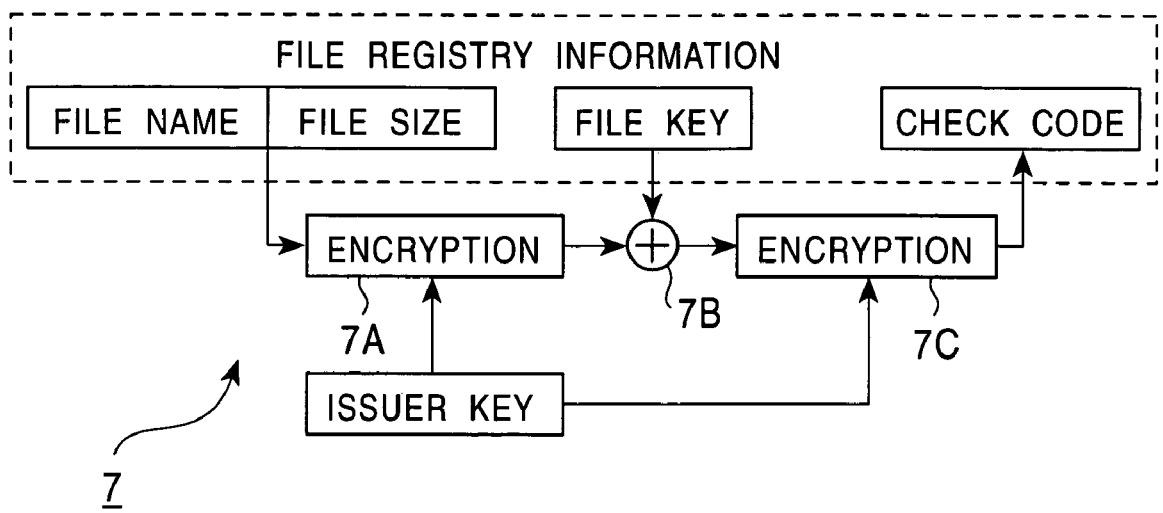
FIG. 5 is a block diagram for explaining creation of file registry information.

As shown in FIG. 5, the file registry information creating unit 7 encrypts information of both the file name and the file size with the issuer key in a first encryption unit 7A, and then computes the exclusive logical sum of an encrypted result and the file key information in an exclusive logical sum computing unit 7B. Further, in a second encryption unit 7C, the file registry information creating unit 7 creates a check code by encrypting a computed result of the exclusive logical sum with the issuer key.

The file name used herein is one that has been assigned to each business organization 4A, 4B, etc. A memory space is secured in the IC card 3 under the file name, and each business organization 4A, 4B, etc. can employ the memory space for providing the service. Thus, when each business organization 4A, 4B, etc. makes an access to the memory space for the service provided by itself, the IC card 3 is accessed based on the file name.

The file size indicates the size of a file created under the file name, and represents the size of a memory space in the IC card 3 that has been allocated for each business organization 4A, 4B, etc. The file key information is key information necessary for accessing a memory area under the file name. The check code is a code used for checking validity of the file registry information.

The file size is set by the issuer depending on the size of a memory area in the IC card 3 that is allowed for each business organization 4A, 4B, etc. to employ. On the other hand, the file name and the file key information are set through, e.g., consultation between each business organization 4A, 4B, etc. and the issuer 5 upon an notice from each business organization 4A, 4B, etc. to the issuer 5 such that the file name and the file key information are specific to each business organization 4A, 4B, etc. and are known to only each business organization 4A, 4B, etc. to which the file name and the file key information have been assigned as the file registry information.

The file registry information creating unit 7 creates the file registry information by arraying the information of the file name, the information of the file size, the file key information, and the check code in a predetermined sequence.

Figure 6:
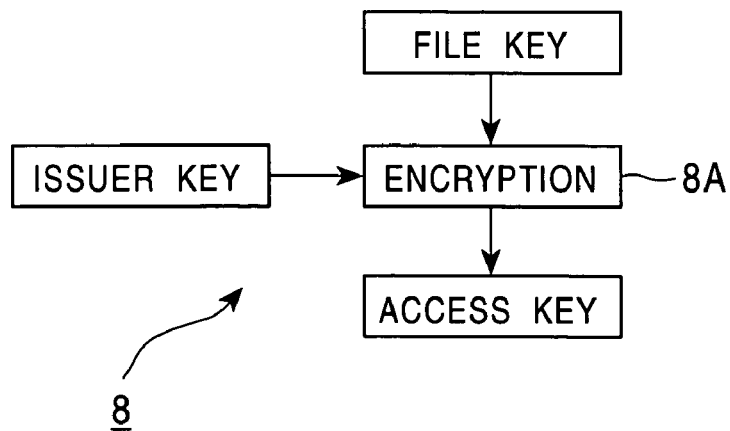
FIG. 6 is a block diagram for explaining creation of an access key.

As shown in FIG. 6, the access key synthesizing unit 8 creates the access key by encrypting the file key with the issuer key in an encryption unit 8A.

As shown in FIG. 7, when the contracts between the issuer 5 and the business organizations 4A, 4B, etc. are renewed for further continuation, the issuer 5 creates issuer key change information by an issuer key change information creating unit 9, and passes the issuer key change information to the business organizations 4A, 4B, etc. Through such processing, the issuer 5 updates the issuer key recorded in the IC card 3 at a certain period in units of a contract renewal period. Also, the issuer 5 creates a new access key through processing executed in the access key synthesizing unit 8 using the issuer key to be newly recorded in the IC card 3, and then passes the new access key to the business organizations 4A, 4B, etc.

The issuer key change information used herein is information for changing the issuer key recorded in the IC card 3.

As shown in FIG. 8, the issuer key change information creating unit 9 creates first key change information K1 in a first encryption unit 9A by encrypting an issuer key, which is to be newly recorded in the IC card 3 (hereinafter this issuer key will be referred to as a "new issuer key" and, in contrast, the issuer key that has been recorded in the IC card 3 will be referred to as an "old issuer key"), with the old issuer key. Further, the issuer key change information creating unit 9 encrypts a predetermined constant with the new issuer key in a second encryption unit 9B, and then creates second key change information K2 in a third encryption unit 9C by encrypting an encrypted result from the second encryption unit 9B with the old issuer key. Thereafter, the issuer key change information creating unit 9 creates issuer key change information by arraying the first and second key change information K1, K2 in a predetermined sequence.

Each business organization 4A, 4B, etc. controls, as shown in FIG. 2, the operation of a reader/writer 11 by a terminal 12, which is constituted by, e.g., a computer, for not only accessing the IC card 3 based on the file registry information, the access key information and the issuer key change information all issued from the issuer 5, but also processing an access result.

The reader/writer 11 used herein modulates information to be transmitted with a predetermined carrier wave and drives a built-in antenna for sending a call to the IC card 3 repeatedly at a predetermined period. When the IC card 3 is placed in the vicinity of the antenna and transmits a response upon receiving the call, the reader/writer 11 requests the IC card 3 to perform mutual authentication. Through the mutual authentication, the reader/writer 11 determines whether the IC card 3 is a target qualified for data communication between them.

When the IC card 3 is determined to be a data exchangeable target through the mutual authentication, the reader/writer 11 notifies the terminal 12 of the situation that data exchange is able to start, and exchanges various data with the IC card 3 under control of the terminal 12.

When the terminal 12 receives a notice from the reader/writer 11 indicating that data exchange is allowed between the terminal 12 and the IC card 3, it transmits an access command to the IC card 3 through the reader/writer 11, thereby accessing the memory space allocated in the IC card 3 for each business organization 4A, 4B, etc. and updating the memory space in accordance with an access result. For example, when the business organization provides a prepaid card system or an electronic cash service using the IC card 3, the terminal 12 executes such processing as to detect an amount of money recorded in the IC card 3, subtract an amount of money to be paid by the user from the detected remaining amount of money, and record an amount of money resulting from the subtraction in the IC card 3. Also, when the business organization issues points corresponding to an amount of money paid by the user and provides various services depending on the accumulated points, the terminal 12 executes such processing as to update the points recorded in the IC card 3 depending on the amount of money paid by the user.

In the above-described access processing, upon a request from the reader/writer 11, the terminal 12 executes processing of another mutual authentication between itself and the IC card 3 using the access key issued by the issuer 5. Further, through the processing in the IC card 3 for the another mutual authentication, the terminal 12 is allowed to access only the memory space set for the relevant business organization.

Figure 9:
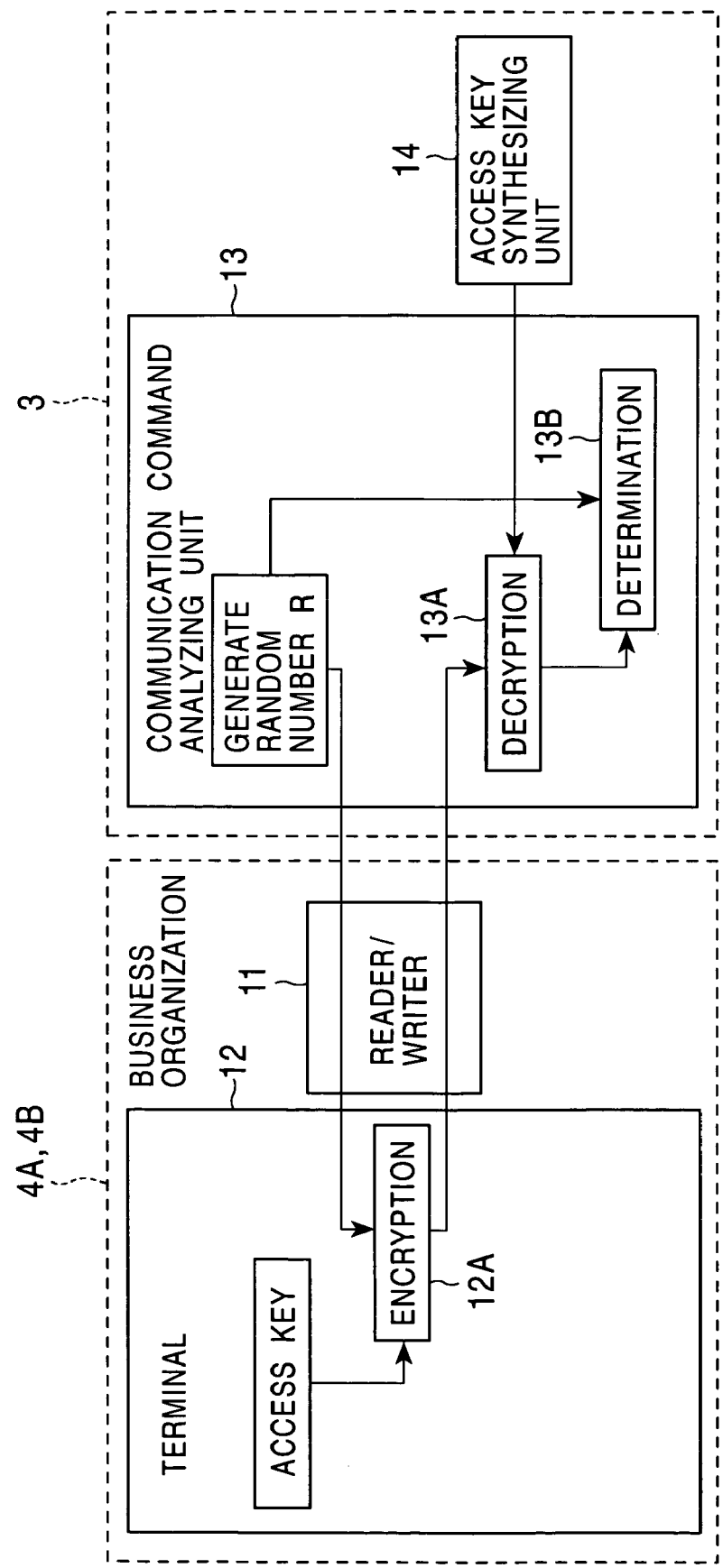
FIG. 9 is a block diagram for explaining processing executed when making an access.

More specifically, as shown in FIG. 9, after issuing an access command to the IC card 3 through the reader/writer 11, the terminal 12 receives a random number R from the IC card 3. Then, the terminal 12 encrypts the received random number R with the access key in an encryption unit 12A, and transmits an encrypted result to the IC card 3 through the reader/writer 11. When the IC card 3 analyzes the encrypted result and replies a success response, the terminal 12 is allowed to continue the processing in accordance with the previously issued access command because the success response means that, as described later, the memory space for the relevant business organization is secured in the IC card 3.

On the other hand, if an error response indicating unsuccessful authentication is received from the IC card 3 as a result of the above-described mutual authentication, this means that the memory space for the relevant business organization is not yet secured in the IC card 3.

In such a case, the terminal 12 transmits the file registry information, which has been acquired from the issuer 5, to the IC card 3 through the reader/writer 11 for securing the memory space for the relevant business organization in the IC card 3. After securing the memory space in the IC card 3, the terminal 12 executes the mutual authentication described above in connection with FIG. 9 again, and then makes an access to the secured memory space.

When the terminal 12 receives a notice regarding the issuer key change information and the new access key from the issuer 5 and is instructed to update the IC card 3 based on those information, the terminal 12 notifies the issuer key change information, etc. to the IC card 3 through the reader/writer 11 before or after a series of the processing described above. During a certain transition period, for example, the terminal 12 determines, from both the result of the mutual authentication using a new access key and the result of the mutual authentication using an old access key, whether the issuer key recorded in the IC card 3 is already updated to the new issuer key. If not yet updated, the terminal 12 notifies the issuer key change information to the IC card 3.

Figure 1:
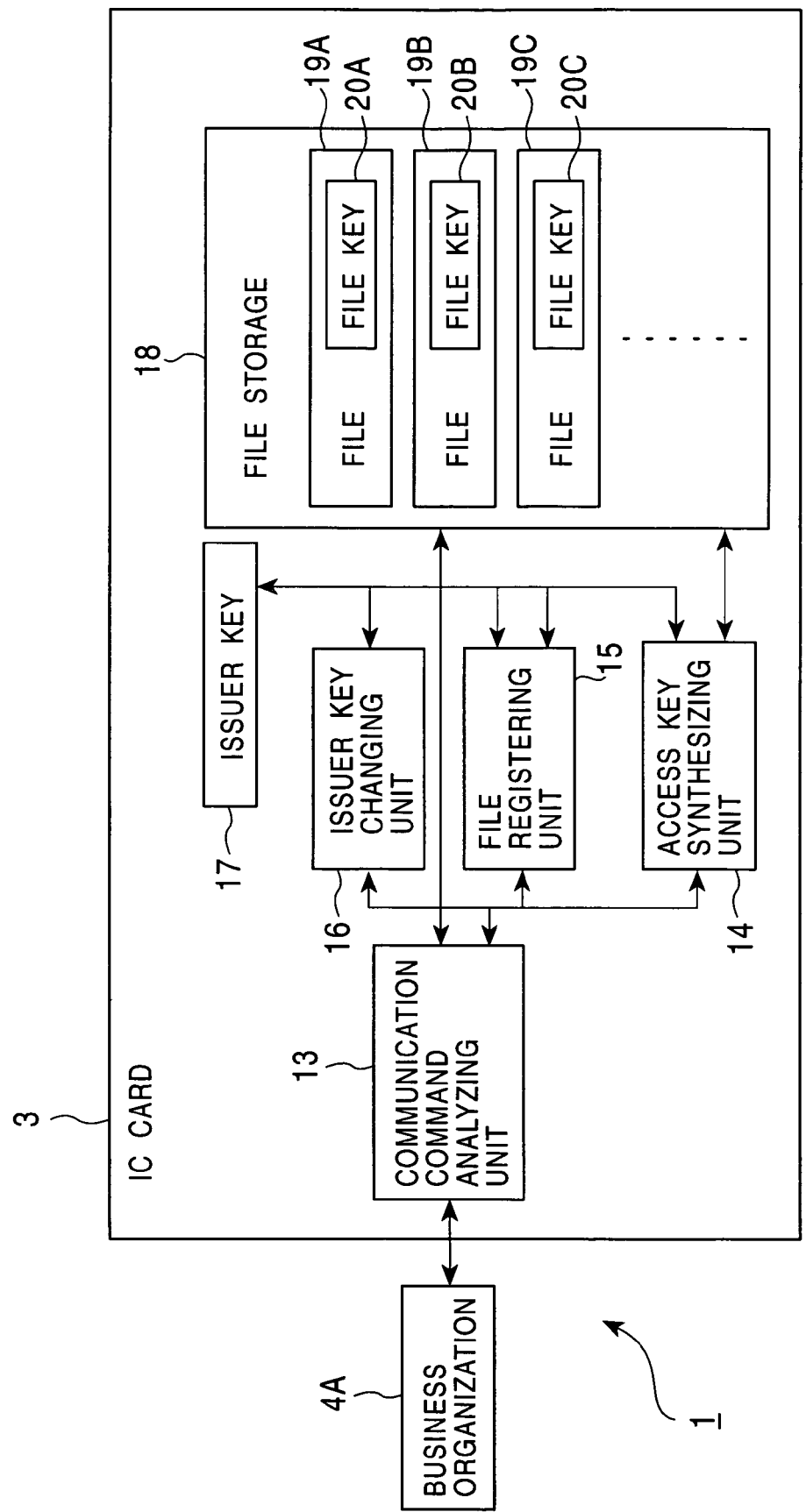
FIG. 1 is a block diagram of an IC card system according to a first embodiment of the present invention.

As shown in FIG. 1, the IC card 3 is a memory card constructed such that, when the card is put close to the reader/writer 11, it can be accessed by the reader/writer 11 in a non-contact manner. The IC card 3 can be carried with the user for use in various places.

More specifically, the IC card 3 comprises a signal processing circuit for receiving data transmitted from the reader/writer 11 and transmitting desired data to the reader/writer 11, a data processing circuit for processing the data received by the signal processing circuit and creating data to be transmitted to the reader/writer 11 via the signal processing circuit, and a memory for holding data necessary for the processing executed by the data processing circuit.

In the IC card 3, the signal processing circuit and the data processing circuit constitute a communication command analyzing unit 13. Further, the data processing circuit constitutes an access key synthesizing unit 14, a file registering unit 15 and an issuer key changing unit 16. The IC card 3 further comprises a memory for holding an issuer key 17. The memory constitutes a file storage 18.

The file storage 18 contains memory spaces assigned to the business organizations 4A, 4B, etc. and memory spaces for recording file keys 20A–20C therein. In the file storage 18, dummy data is recorded based on the file name and the file size which are assigned as the file registry information, whereby a memory space is assigned to the relevant business organization in accordance with the file registry information. Also, each business organization can update the file comprising the dummy data so that the assigned memory space is freely usable by the business organization. Further, the file storage 18 stores therein the file keys 20A, 20B and 20C in association with the memory spaces that have been allocated as described above.

When the IC card 3 is put close to the reader/writer 11 and a high-frequency signal is induced in the antenna, the communication command analyzing unit 13 processes the high-frequency signal and receives data transmitted from the reader/writer 11. Since the reader/writer 11 sends a call to the IC card 3 repeatedly, the communication command analyzing unit 13 replies a response to the reader/writer 11 upon receiving the call. Subsequently, the communication command analyzing unit 13 executes the processing of mutual authentication between the IC card 3 and the reader/writer 11. If the mutual authentication is successfully completed, desired data is exchanged between the communication command analyzing unit 13 and the reader/writer 11.

In order to perform such data exchange, upon receiving an access request from the reader/writer 11, the communication command analyzing unit 13 refers to the file name affixed to the access request and then executes the processing of mutual authentication between the IC card 3 and the reader/writer 11 by using the file key 20A, 20B or 20C of the corresponding file 19A, 19B or 19C.

More specifically, as shown in FIG. 9, upon receiving the access command from the reader/writer 11, the communication command analyzing unit 13 creates a random number R and transmits it to the reader/writer 11, and then receives data that is responsively transmitted from the reader/writer 11. Thereafter, the communication command analyzing unit 13 instructs the access key synthesizing unit 14 to create an access key from the corresponding file key for the file requested by the access command, and acquires the access key created by the access key synthesizing unit 14 in response to the instruction.

To that end, in response to the instruction from the communication command analyzing unit 13, the access key synthesizing unit 14 creates and outputs the access key in accordance with the same manner as executed by the access key synthesizing unit 8 at the issuer 5 (see FIG. 6). The communication command analyzing unit 13 decrypts the encrypted data (random number), which is outputted from the reader/writer 11, in a decryption unit 13A using the access key created by the access key synthesizing unit 14, and then determines in a determining unit 13B whether the decrypted random number is identical to the original one R. In this way, the communication command analyzing unit 13 executes the processing of the mutual authentication for the business organization 4A, for example. Only when the business organization 4A is authorized to access the file specified by the access command, the communication command analyzing unit 13 executes the subsequent processing requested by the access command. For example, when the access command requests loading of the contents of the corresponding file, the file contents is transmitted to the reader/writer 11. Also, when the access command requests update of the contents of the corresponding file, the file contents is updated in accordance with data subsequently transmitted from the reader/writer 11.

On the other hand, if the memory space is not yet allocated for the business organization 4A, for example, i.e., if the file specified by the access command is not yet registered in the file storage 18, the communication command analyzing unit 13 notifies an error response to the reader/writer 11. Then, when the business organization having transmitted the access command is the business organization 4A which is under contract with the issuer 5 for usage of the IC card 3, the reader/writer 11 transmits the file registry information and the communication command analyzing unit 13 receives the transmitted file registry information. Additionally, in the case of allocating a memory space for a predetermined business organization beforehand when the IC card 3 is issued at the issuer 3, for example, rather than at the time of making an access, the communication command analyzing unit 13 likewise receives the file registry information.

Figure 10:
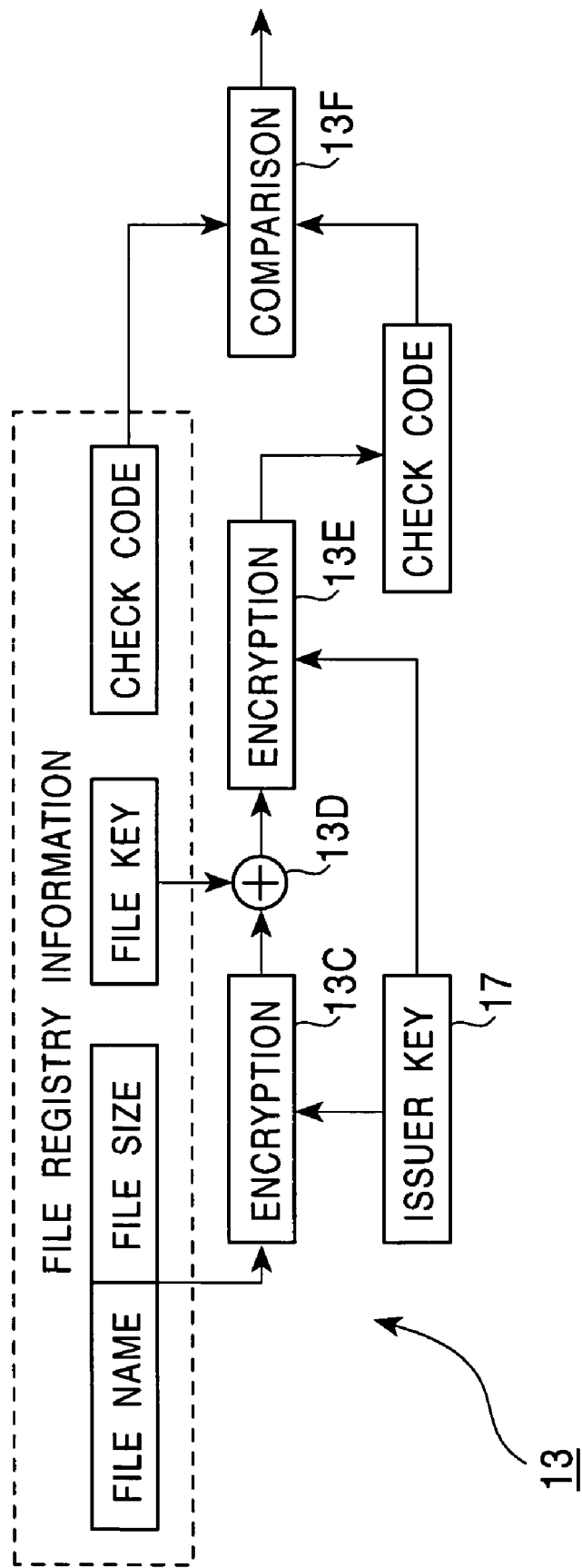
FIG. 10 is a block diagram for explaining processing of file registry information.

Upon thus receiving the file registry information, as shown in FIG. 10, the communication command analyzing unit 13 encrypts information of both the file name and the file size, which are assigned as the file registry information, with the issuer key 17 in a first encryption unit 13C, and then computes the exclusive logical sum of an encrypted result and the file key information, which is also assigned as the file registry information, in an exclusive logical sum computing unit 13D at a subsequent stage. Further, in a second encryption unit 13E, the communication command analyzing unit 13 creates a check code by encrypting a computed result of the exclusive logical sum with the issuer key.

The communication command analyzing unit 13 compares the thus-created check code with the check code, which is also assigned as the file registry information, in a comparator 13F and allocates a memory space for the relevant business organization in the file storage 18 depending on a compared result.

Figure 11:
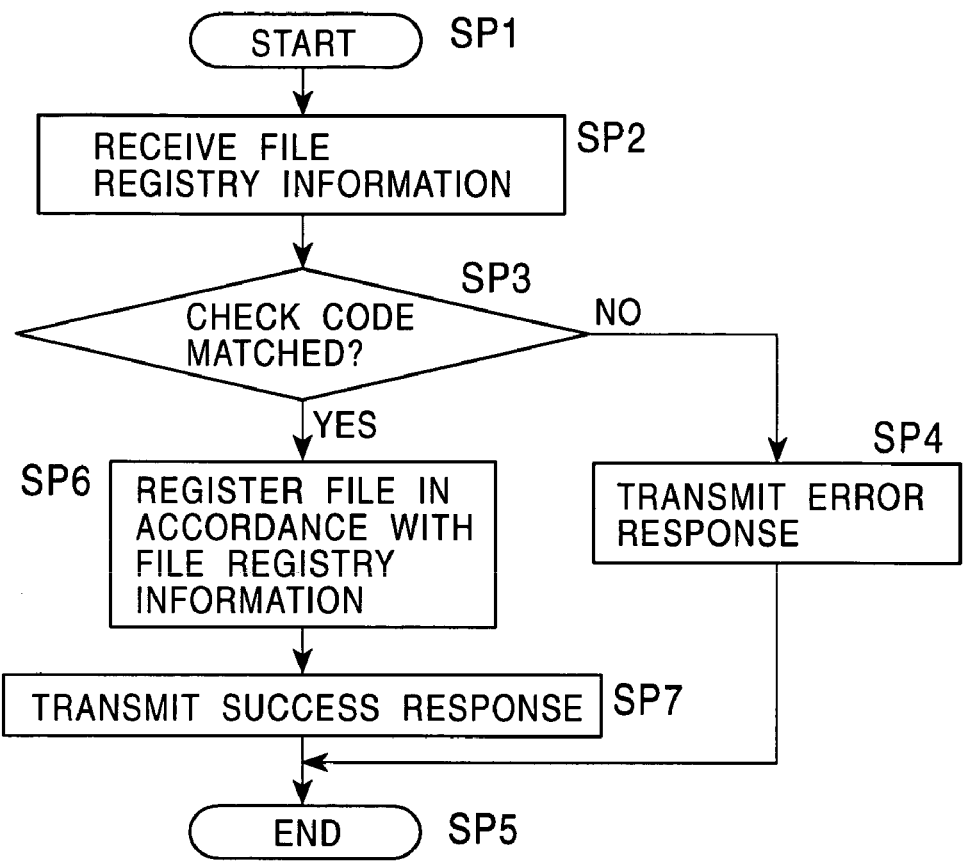
FIG. 11 is a flowchart for explaining a sequence of processing in accordance with file registry information.

To explain in more detail, as shown in FIG. 11, the communication command analyzing unit 13 goes from step SP1 to SP2 for receiving the file registry information, and then confirms the check code in next step SP3 as described above in connection with FIG. 10. If a confirmation result is unsuccessful in step SP3, it goes to step SP4 for transmitting an error response to the reader/writer 11, and then goes to step SP5, thereby completing this sequence of processing.

If the check code is confirmed to be in match with the assigned one, the communication command analyzing unit 13 goes from step SP3 to SP6 for recording a file in the file storage 18 in accordance with the received file registry information. In this step, the communication command analyzing unit 13 activates the file registering unit 15 to record dummy data based on the file name and the file size, which are assigned as the file registry information, in the file storage 18, thereby securing a memory space. Further, the communication command analyzing unit 13 records the file key, which is also assigned as the file registry information, in the file storage 18 in association with the file. On that occasion, the file registering unit 15 executes the processing to record the file in the file storage 18 in accordance with the file registry information.

Figure 12:
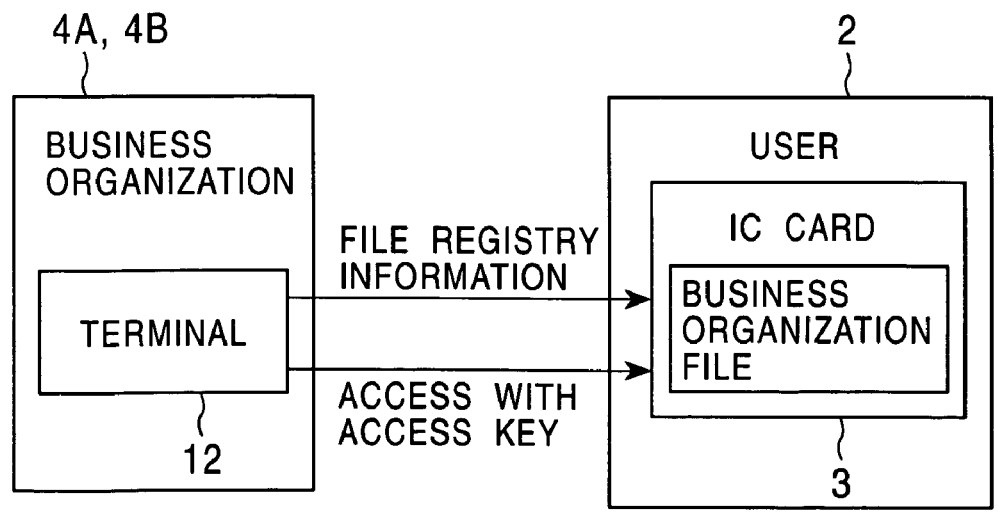
FIG. 12 is a block diagram for explaining processing in accordance with file registry information.

Thus, in the IC card 3, the file that can be accessed by only a specific business organization is recorded in the memory along with the file registry information, as shown in FIG. 12.

Figure 13:
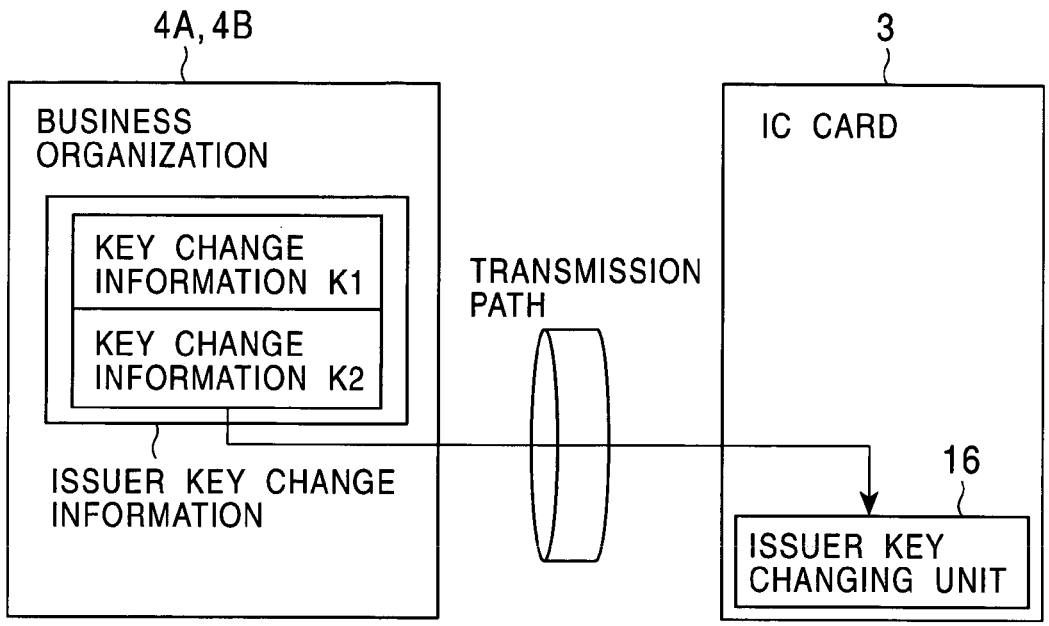
FIG. 13 is a block diagram for explaining processing in accordance with issuer key change information.

Also, as shown in FIG. 13, when the issuer key change information is inputted from the reader/writer 11, the communication command analyzing unit 13 passes the issuer key change information to the issuer key changing unit 16, and then notifies a processing result from the issuer key changing unit 16 to the reader/writer 11.

Figure 14:
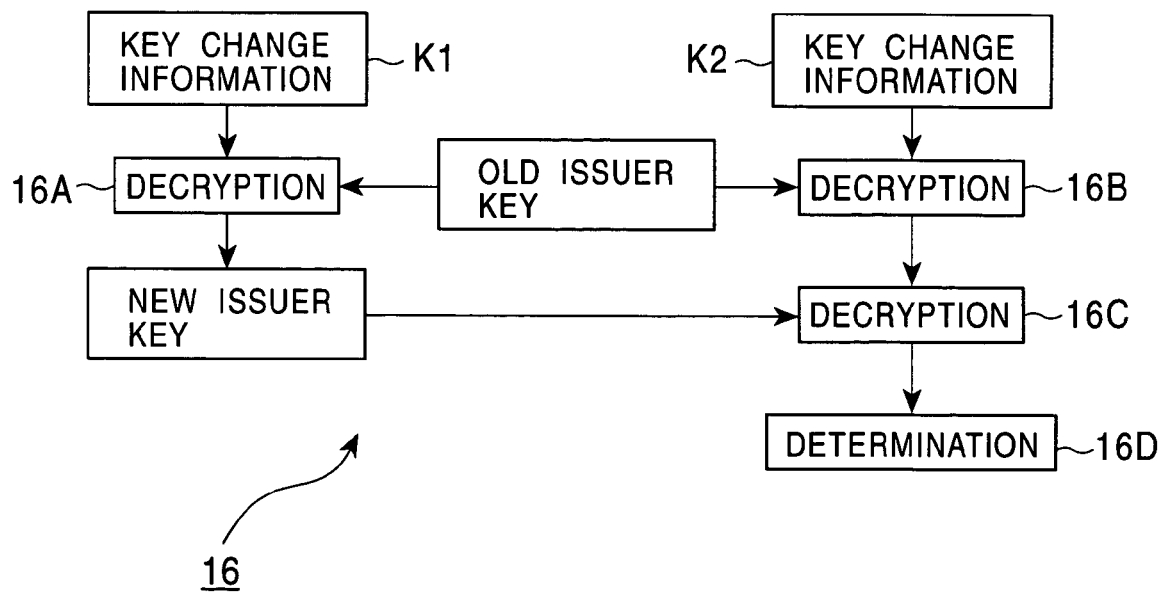
FIG. 14 is a block diagram for explaining processing of issuer key change information.

More specifically, as shown in FIG. 14, the issuer key changing unit 16 separates the issuer key change information into first and second key change information K1, K2, and then restores a new issuer key in a decryption unit 16A by processing the first key change information K1 with the issuer key (i.e., the old issuer key) held in the unit 16. Further, the issuer key changing unit 16 processes the second key change information K2 with the old issuer key in a decryption unit 16B, and then processes a result from the decryption unit 16B with the new issuer key in a subsequent decryption unit 16C, thereby reproducing a constant that has been used in creating the issuer key change information (see FIG. 8). In a next determining unit 16D, the issuer key changing unit 16 determines whether the thus-reproduced constant is the same as the proper one that has been set at the time of creating the issuer key change information.

If the check codes are determined to be not in match with each other, the issuer key changing unit 16 notifies such a determination result to the communication command analyzing unit 13, whereupon the IC card 3 sends a response indicating unsuccessful confirmation to the reader/writer 11. On the other hand, if the check codes are determined to be in match with each other, the issuer key changing unit 16 notifies such a determination result to the communication command analyzing unit 13, whereupon the IC card 3 sends a success response to the reader/writer 11.

Figure 15:
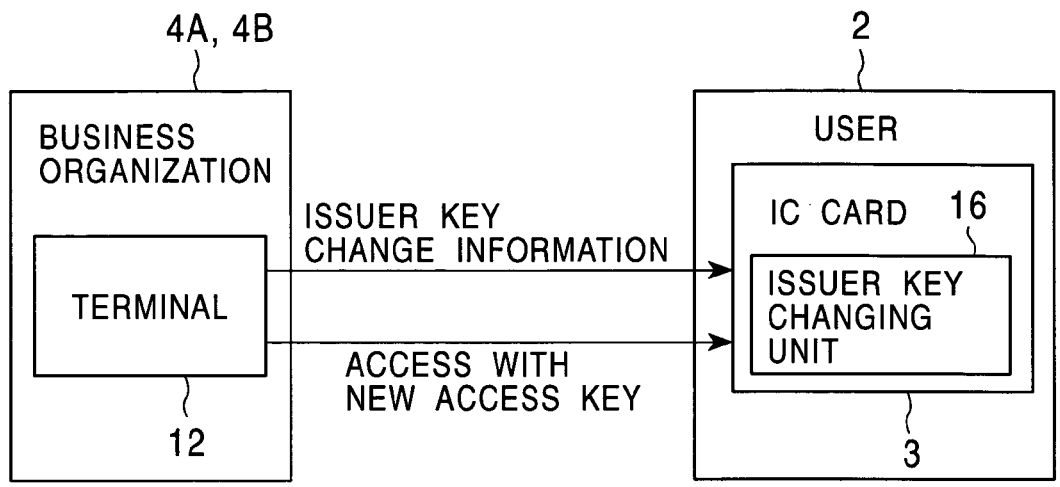
FIG. 15 is a block diagram for explaining processing in accordance with issuer key change information.

Furthermore, if the check codes are determined to be in match with each other, the issuer key changing unit 16 updates the issuer key 17 held in the memory with the new issuer key that has been detected by processing the issuer key change information. As a result, as shown in FIG. 15, after the issuer key change information has been issued and the issuer key has been changed, the IC card 3 allows an access to the corresponding memory space with the new access key.

(1-2) Operation of First Embodiment

In the IC card system 1 (FIGS. 1 to 3) having the above-described construction, the issuer 5 serving as a system management sector issues the IC cards 3 in each of which the issuer key specific to the management sector is recorded.

Also, the issuer 5 assigns, to each of the business organizations 4A, 4B, etc. which want to provide their services using the IC cards 3, an access key that has been created by encrypting file key information specific to each business organization 4A, 4B, etc. with the issuer key (FIG. 6). Further, in order that the memory space assigned to each business organization 4A, 4B, etc. can be specified by a file, information of both the file name and the file size regarding that file is encrypted by the issuer key to create a check code (FIG. 5). The file registry information containing the check code, the information of both the file name and the file size, as well as the file key information is then provided to each business organization 4A, 4B, etc.

In the IC card system 1, when some file registry information is transmitted to the IC card 3, a check code is produced in the IC card 3 based on the issuer key in the same manner as in creating the file registry information, and it is determined whether the produced check code is in match with the check code that has been assigned as the file registry information (FIGS. 10 to 12). Through those steps, it is determined whether the transmitted file registry information has been properly issued by the issuer 5. Further, if it is determined that the transmitted file registry information has been properly issued by the issuer 5, dummy data is recorded in the IC card 3 based on the file name and the file size which are assigned as the file registry information, and a memory space is secured in the IC card 3 for the business organization in accordance with the file registry information so that the memory space can be accessed with the fine name. Simultaneously, the file key information is recorded in association with the file name so that an access to the memory space is allowed.

Stated otherwise, in the IC card system 1, since whether the transmitted file registry information has been properly issued by the issuer 5 is determined using the check code, it is possible to prevent a fraudulent action, for example, that a certain business organization creates file registry information and employs the IC card system without authorization, or that any person tampers the contents of the IC card 3.

After the memory space for the business organization has been secured in the IC card 3 as described above, the IC card 3 transmits the random number R (FIG. 9) when an access command is inputted to the IC card 3 from the business organization side. The business organization side encrypts the random number R with the access key and transmits an encrypted data to the IC card 3. The IC card 3 side decrypts the received data with the access key information corresponding to the file name that is affixed to the access command, and then determines whether a restored random number is identical to the transmitted random number R. It is thereby determined whether the relevant business organization is a proper one that has been authorized to access the file. When the relevant business organization is determined to be a proper one, the contents of the file is transmitted to the business organization or updated in accordance with the access command.

As seen from the above description, each of business organizations utilizing the IC card 3 in common can complete the processing of the mutual authentication just by making an access to the IC card 3 with the file name that is assigned to itself and recorded in the IC card 3, encrypting data transmitted from the IC card 3 with the file key information, and returning encrypted data to the IC card 3 in accordance with a request from the IC card 3. Thus, the business organization can handle the IC card 3 as if it is a memory card dedicated to the business organization. Also, since access processing is allowed only after authentication of the business organization using the file key information, it is possible to prevent any other business organization from glancing furtively at a file recorded in the IC card 3 for the relevant business organization and from tampering the contents of the file. Accordingly, the IC card system 1 enables the IC card 3 to be used for a plurality of business organizations in common.

Since the random number R is transmitted and received after being encrypted with the access key information, it is also possible to prevent the access key information itself on the side of the business organization from leaking to the outside. This feature contributes to further improving the security of the IC card system.

Moreover, the file key information recorded in the IC card 3 corresponding to each file is processed while being held in the IC card 3, and the access key information is created based on the file key information and then passed to the business organization. Therefore, the file key information itself can be kept confidential even against the business organization, and the system security can be further improved from this point of view.

The issuer key, which is a basic premise for carrying out the above-described processing, can be known to and managed by only the issuer 5 serving as a management sector, and the access key information is created and issued to the business organization in such a manner that even the business organization has a difficulty in knowing the issuer key. Accordingly, it is possible to prevent a fraudulent action, for example, that a certain business organization employs the memory space in the IC card 3 in a size larger than set under the contract without authorization, or that any person tampers the contents of the IC card 3.

Also, to improve the security of the system in a state of employing the IC cards 3 in routine fashion, the issuer key is required to be periodically changed. Further, it is probable that some business organization does not want to renew the contract. In that case, the system must be modified such that the relevant business organization cannot handle the IC cards 3 any more.

To deal with such situations, in the IC card system 1, issuer key change information is periodically created at the issuer 5 by encrypting a new issuer key and a predetermined constant with the old issuer key (FIG. 8), and the created issuer key change information is provided to each business organization (FIG. 7). In addition, file key information corresponding to the issuer key change information is also provided to each business organization. Then, the issuer key change information is transmitted to the IC card 3 from the business organization (FIG. 13). In the IC card 3, the issuer key change information in the encrypted form is decrypted with the old issuer key to restore the new issuer key and the predetermined constant. From the decrypted constant, it is determined whether the issuer key change information has been properly issued by the issuer 5 (FIG. 14). When it is determined that the issuer key change information has been properly issued by the issuer 5, the old issuer key that has been used so far is updated to the new issuer key.

In the IC card system 1 where the issuer key has been thus updated, even the business organization which has been authorized to access the IC card 3 before the update is only able to access the IC card 3 by employing the file key information corresponding to the new issuer key.

When updating the issuer key in the IC card system 1 as described above, the new issuer key and the predetermined constant are encrypted with the old issuer key to create the issuer key change information K1, K2, respectively. Based on the predetermined constant derived from the issuer key change information K1, K2, it is determined whether the issuer key change information has been properly issued by the issuer 5. Thus, fraudulent change of the issuer key can be prevented and the reliability of the IC card system 1 can be ensured.

(1-3) Advantages of First Embodiment

With the construction described above, the access key created based on both the issuer key information and the file key information is assigned to each business organization, and the business organization is allowed to access the IC card 3 after authentication using the assigned access key. A plurality of business organizations can therefore utilize one IC card in common.

Also, information of the name of the file employed by each business organization and information of the file size for specifying the size of a memory space to be allocated for each business organization are encrypted with the issuer key to create the file registry information, and the memory space is allocated in accordance with the file registry information. Therefore, the memory space can be provided to each business organization in size depending on a demand from each business organization. Further, since an access is made on the basis of the file name, each business organization can access the memory space assigned to itself through simple access processing.

Moreover, the check code is created by encrypting information of both the file name and the file size with the issuer key, and the file registry information is created by adding the information of both the file name and the file size to the check code. Accordingly, it is possible to prevent a fraudulent action, for example, that a certain business organization employs the memory space in the IC card 3 in a size larger than set under the contract without authorization, or that any person tampers the contents of the IC card 3.

Additionally, issuer key change information is created by encrypting the new issuer key with the old issuer key, and the issuer key held in the IC card 3 is updated in accordance with the issuer key change information. It is therefore possible to improve the system security and inhibit business organization, which does not want to renew the contract, from employing the IC card system any more.

(Second Embodiment)

Figure 16:
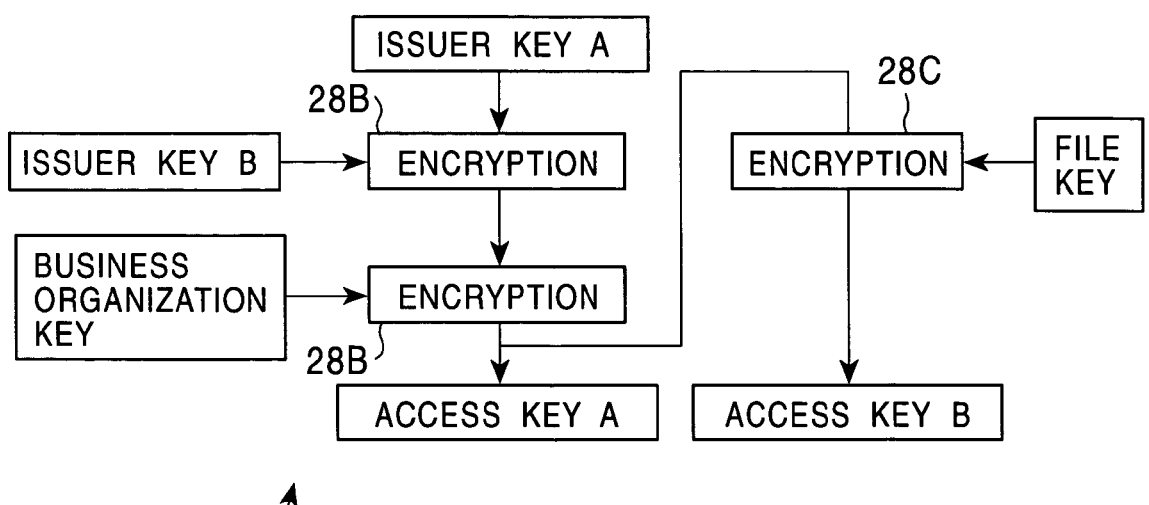
FIG. 16 is a block diagram for explaining creation of an access key in an IC card system according to a second embodiment.

FIG. 16 is a block diagram showing the construction of an access key synthesizing unit in an IC card system according to a second embodiment of the present invention in comparison with FIG. 8. The IC card system according to this second embodiment has the same construction as that of the first embodiment except for the construction related to an access key synthesizing unit 28.

In the IC card system of this embodiment, the issuer creates two access keys A and B using two issuer keys A and B. More specifically, the access key synthesizing unit 28 creates the access key A by encrypting the issuer key A with the issuer key B in an encryption unit 28A, and then encrypting an encrypted result from the encryption unit 28A with a business organization key in a subsequent encryption unit 28B. The business organization key is key information specific to each business organization.

Further, the access key synthesizing unit 28 creates the access key B by encrypting the access key A with a file key in a subsequent encryption unit 28C. The issuer passes both the access keys A and B to the business organization.

Figure 17:
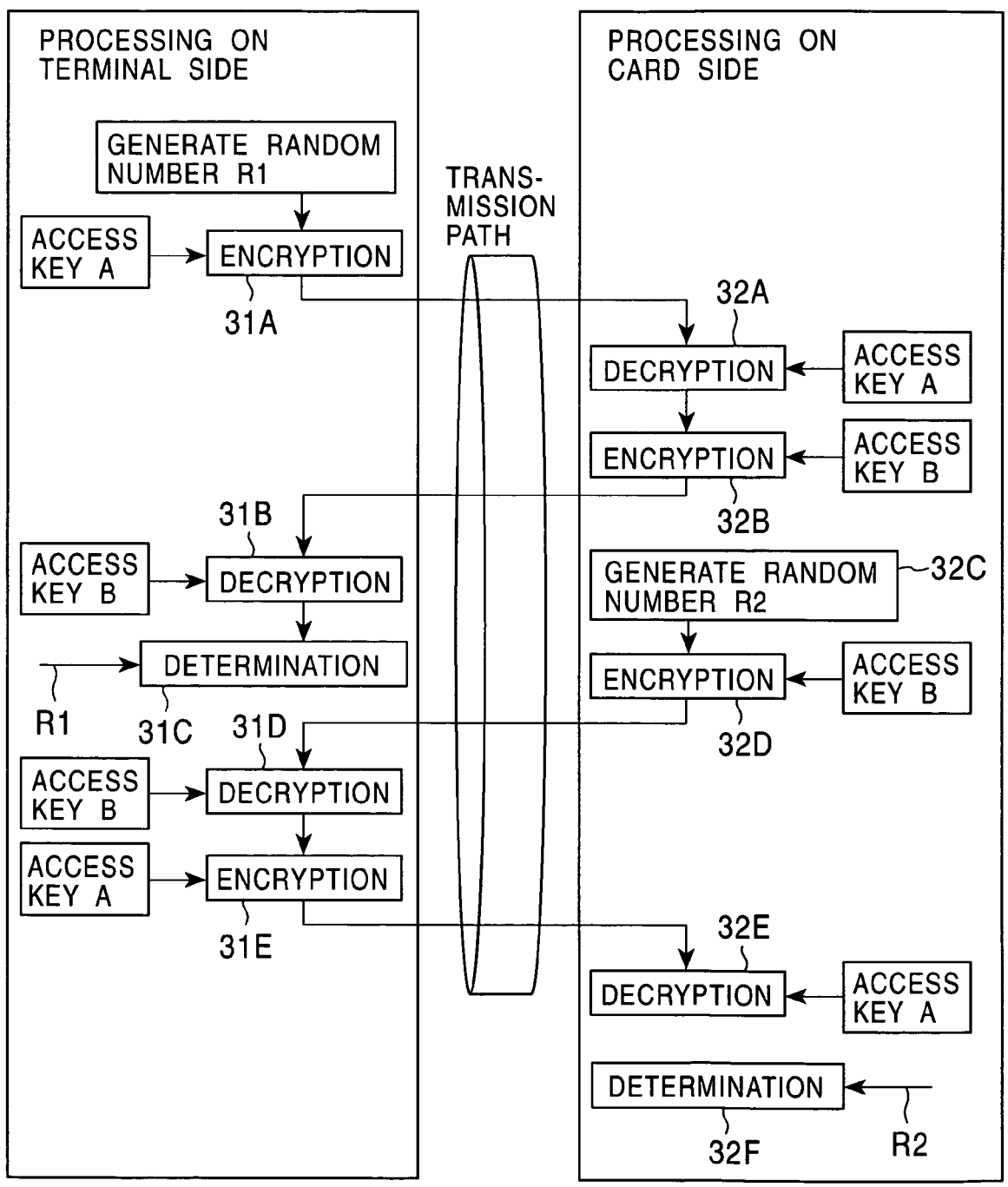
FIG. 17 is a block diagram for explaining processing of an access key in the construction of FIG. 16.

Corresponding to the use of the two access keys A and B, as shown in FIG. 17, a terminal in the business organization first generates a random number R1 and encrypts the random number R1 with the access key A in an encryption unit 31A. Then, at the time of accessing an IC card, the terminal in the business organization transmits an encrypted result from the encryption unit 31A to the IC card together with, e.g., an access command.

On the side of the IC card, the communication command analyzing unit restores the random number R1 by decrypting the encrypted result, which has been transmitted from the business organization, in a decryption unit 32A with the same access key A as used on the business organization side. Further, the communication command analyzing unit creates the second access key B from the first access key A and the file key for a file to be accessed, and encrypts a decrypted result from the decryption unit 32A with the second access key B in a subsequent encryption unit 32B. An encrypted result from the encryption unit 32B is transmitted to the business organization.

Correspondingly, on the business organization side, the information thus transmitted from the IC card is decrypted with the second access key B in a decryption unit 31B. A determining unit 31C then determines whether the restored random number is identical to the original one R1.

Further, on the IC card side, a random number R2 is created and encrypted with the second access key B in an encryption unit 32D. An encrypted result is transmitted to the business organization. Correspondingly, on the business organization side, the transmitted information is decrypted with the second access key B in a decryption unit 31D to restore the random number R2. Then, the restored random number R2 is encrypted with the first access key A in a subsequent encryption unit 31E, and an encrypted result is transmitted to the IC card.

On the IC card side, the transmitted random number R2 is restored in a decryption unit 32E using the first access key A. A subsequent determining unit 32F then determines whether the restored result is identical to the original random number R2.

When a match result is obtained in the determination on both sides of the IC card and the terminal in the business organization, the mutual authentication is completed and further processing to make an access to the memory space is started.

Thus, as shown in FIGS. 16 and 17, since a random number is encrypted with the access key whenever it is transmitted, the random number used for the authentication is avoided from being transmitted in the form as it is unlike the above-described first embodiment. The system security is therefore improved correspondingly. Also, since a random number is generated in each of both the sides and confirmed on the other side, the system security can be further improved.

(3) Other Embodiments

While the above embodiments have been described in connection with the case of encrypting the file key information with the issuer key to create the access key, the present invention is not limited to that case. For example, the access key may be created in multiple stages using a plurality of issuer keys. Thus, it is essential that access key information is created in a predetermined management sector from file key information specific to each business organization and issuer key information specific to the management sector while keeping them against the third party, and processing for authentication is executed between a terminal in the business organization and the IC card based on the access key information. As a result, similar advantages to those in the above-described embodiments can be obtained.

Also, the above embodiments have been described in connection with the case of executing the processing of authentication and allocation of a memory space by transmitting and receiving the file registry information that is made up of information of both the file name and the file size, as well as a check code. The present invention is however not limited to that case. For example, the system may be modified so as to execute the processing of authentication for each business organization, and then receive registration of a memory space. A conceivable manner to realize such a case is to execute the processing of authentication by transmitting and receiving predetermined information that has been encrypted using both the key information specific to the business organization and the issuer key, and then separately transmitting and receiving information that has been created by encrypting the information of both the file name and the file size, for example, with both the key information specific to the business organization and the issuer key, thereby securing the memory space.

Further, while the above embodiments have been described in connection with the case of processing the file registry information, the access key information and the issuer key change information with the same issuer key, the present invention is not limited to that case. For example, those items of information may be separately processed using individual key information specific to the issuer.

Moreover, the above embodiments have been described in connection with the case where the present invention is applied to an IC card system employing non-contact type IC cards. However, the present invention is not limited to that case, but is also applicable to systems employing various portable electronic devices, such as an IC card system employing contact type IC cards and a system employing other equipment, e.g., cellular phones, than IC cards.

According to the present invention, as described above, an access key is created based on issuer key information managed by a management sector and file key information specific to each business organization, and the created access key is assigned to the business organization. A portable electronic device is then accessed using the access key. Therefore, an IC card can be used for a plurality of business organizations in common.

What is claimed is:

1. An information processing system with a portable electronic device including means for processing information and a memory employed by a plurality of business organizations, said system comprising:

a plurality of access apparatuses, wherein each of said plurality of business organizations is associated with at least one of said plurality of access apparatuses, wherein each of said plurality of access apparatuses are operable to access said portable electronic device, each of said plurality of access apparatuses including means for executing an authentication between an associated business organization and said portable electronic device by using access key information, and each of said plurality of access apparatuses including means for transmitting file registry information to said portable electronic device; and a management sector including means for generating said file registry information and said access key information based on file key information and issuer key information processed by said management sector, wherein said management sector is adapted to create said file registry information at least partly by encrypting memory space specifying information to at least partly produce an encrypted result, wherein said file registry information includes said memory space specifying information in an unencrypted condition and the encrypted result, and wherein said management sector is adapted to create said access key information for each of the business organizations by encrypting based on said file key information and said issuer key information, wherein said file key information is assigned to said associated business organization.

2. An access apparatus for accessing a portable electronic device having an information processing means, said access apparatus being employed by an information processing system in which a memory in said portable electronic device is employed by a plurality of business organizations, said access apparatus comprising:

means for executing an authentication between one of the plurality of business organizations and the portable electronic device by using access key information; and means for transmitting file registry information to the portable electronic device, wherein said file registry information and said access key information are generated by a management sector based on file key information and issuer key information processed by said management sector, and wherein said file registry information is created at least partly by encrypting memory space specifying information for specifying a size of a memory space to be secured in the portable electronic device to at least partly produce an encrypted result, wherein said file registry information includes said memory space specifying information in an unencrypted condition and the encrypted result, and wherein said access key information includes encrypted information created by encrypting based on said file key information and said issuer key information, wherein said file key information is assigned to said one of the plurality of business organizations.

3. The access apparatus according to claim 2, wherein said transmitting means is adapted to transmit issuer key change information to said portable electronic device for updating said issuer key information stored in said portable electronic device, said issuer key change information being created by encrypting new issuer key information which is to be newly recorded in said portable electronic device, with said issuer key information.

4. The access apparatus according to claim 3, wherein said access apparatus acquires said issuer key change information and corresponding access key information from said management sector.

5. A portable electronic device including a memory unit which is employed by a plurality of business organizations, said portable electronic device comprising:

a memory having memory space allocated to said plurality of business organizations, said memory storing file key information specific to each of said plurality of business organizations and issuer key information; and means for processing information transmitted from any of a plurality of access apparatuses, wherein each of said plurality of access apparatuses are associated with one of said plurality of business organizations, wherein each of said plurality of access apparatuses are operable for accessing said portable electronic device, said information comprising file registry information and access key information, wherein said file registry information and said access key information are generated by a management sector, said file registry information being created at least partly by encrypting memory space specifying information for specifying a size of a memory space to be secured in the portable electronic device to at least partly produce an encrypted result, wherein said file registry information includes said memory space specifying information in an unencrypted condition and the encrypted result, and wherein said access key information is created by encrypting based on said file key information and said issuer key information, wherein said file key information is assigned to one of the plurality of business organizations, and said processing means being adapted to extract said memory space specifying information and said file key information from the received file registry information.

6. The portable electronic device according to claim 5, wherein said portable electronic device receives, from one of said access apparatuses, said file registry information that is created by encrypting memory space specifying information for specifying at least a size of the memory space to be secured in said portable electronic device and said file key information with second specific key information possessed by said management sector;

extracts said memory space specifying information and said file key information from the received file registry information; and allocates the memory space in accordance with said memory space specifying information while recording said file key information in association with the allocated memory space.

7. The portable electronic device according to claim 5, wherein said file registry information is created by adding said memory space specifying information and said file key information to encrypted information that is created by encrypting said memory space specifying information and said file key information with said issuer key information.

8. The portable electronic device according to claim 5, wherein said portable electronic device is adapted to receive issuer key change information for updating said issuer key information stored in said memory, said issuer key change information being created by encrypting new issuer key information which is to be newly recorded in said portable electronic device, with said issuer key information, said processing means adapted to extract, from said received issuer key change information, the new issuer key information which is to be newly recorded in the portable electronic device based on said issuer key information stored in said memory.

9. The portable electronic device according to claim 5, wherein said portable electronic device is in the form of a card.

10. The portable electronic device according to claim 5, wherein said portable electronic device is a portable terminal.

11. The portable electronic device according to claim 10, wherein said portable terminal is a cellular phone.

12. A method of using a memory space allocated in a memory provided in a portable electronic device to be employed by a plurality of business organizations, said method comprising the steps of:

transmitting file registry information to said portable electronic device; and authenticating the portable electronic device by using access key information, wherein said file registry information and said access key information are generated by a management sector based on file key information and issuer key information processed by said management sector, said file registry information is created at least partly by encrypting memory space specifying information for specifying a size of a memory space to be secured to the portable electronic device to at least partly produce an encrypted result, wherein said file registry information includes said memory space specifying information in an unencrypted condition and the encrypted result, and wherein said access key information is created by encrypting based on said file key information and said issuer key information, wherein said file key information is assigned to one of the plurality of business organizations.

13. The method of using a memory space according to claim 12, including a step for updating the issuer key information stored in the portable electronic device by transmitting issuer key change information generated by encrypting updated issuer key information, which is to be newly recorded in the portable electronic device, with said issuer key information.

14. The method of using a memory space according to claim 13, further comprising a step of sending updated access key information corresponding to the updated issuer key information.

* * * * *